US012394895B2

(12) United States Patent
Seo et al.

(10) Patent No.: US 12,394,895 B2
(45) Date of Patent: Aug. 19, 2025

(54) META-ANTENNA FOR 6TH GENERATION NETWORK PASSIVE BEAM-FORMING AND METHOD THEREFOR

(71) Applicant: RESEARCH & BUSINESS FOUNDATION SUNGKYUNKWAN UNIVERSITY, Suwon-si (KR)

(72) Inventors: Mun Kyo Seo, Suwon-si (KR); Amir Altaf, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 118 days.

(21) Appl. No.: 18/530,877

(22) Filed: Dec. 6, 2023

(65) Prior Publication Data

US 2024/0195062 A1 Jun. 13, 2024

(51) Int. Cl.
*H01Q 15/00* (2006.01)
*H01Q 1/48* (2006.01)
*H01Q 3/44* (2006.01)
*H01Q 13/10* (2006.01)

(52) U.S. Cl.
CPC ................. *H01Q 3/44* (2013.01); *H01Q 1/48* (2013.01); *H01Q 13/106* (2013.01)

(58) Field of Classification Search
CPC ...... H01Q 1/38-48; H01Q 3/44; H01Q 13/10; H01Q 15/00; H01Q 15/008; H01Q 21/065
See application file for complete search history.

(56) References Cited

U.S. PATENT DOCUMENTS 7,855,689 B2 * 12/2010 Fukui .................. H01Q 21/068 343/846
11,978,962 B2 * 5/2024 Zólomy ............. H01Q 15/0066

FOREIGN PATENT DOCUMENTS

| | | | |
|---|---|---|---|
| JP | 2021-190719 | A | 12/2021 |
| KR | 10-2037227 | B1 | 10/2019 |
| KR | 10-2113089 | B1 | 5/2020 |
| KR | 10-2162799 | B1 | 10/2020 |
| KR | 10-2219219 | B1 | 2/2021 |
| KR | 10-2446369 | B1 | 9/2022 |

* cited by examiner

*Primary Examiner* — Hasan Islam

(57) ABSTRACT

A meta-antenna apparatus and method are provided. The meta-antenna includes a substrate comprising a ground plane, a first slot structure including slots disposed on the ground plane, feed lines electrically connected to the first slot structure, and a meta-surface including a meta-material, and unit cells, the meta-surface being spaced apart from the ground plane. The unit cells each includes a square cross-sectional shape, and a ring-shaped metal pattern formed on one side thereof, and an inner diameter of the metal pattern is smaller than half a length of one side of the square of a unit cell.

16 Claims, 9 Drawing Sheets

META-ANTENNA FOR 6TH GENERATION NETWORK PASSIVE BEAM-FORMING AND METHOD THEREFOR

CROSS-REFERENCE TO RELATED APPLICATION(S)

This application claims the benefit under 35 U.S.C. 119 of Korean Patent Application No. 10-2022-0169391, filed on Dec. 7, 2022, in the Korean Intellectual Property Office, the entire disclosures of which are incorporated by reference for all purposes.

BACKGROUND

1. Field

The present disclosure relates to a meta-antenna, and more particularly, to a meta-antenna for 6G (6th Generation) network passive beam-forming and a method therefor.

2. Description of Related Art

A 5G communication system is configured based on sub-6 GHz signals, and millimeter-wave band (30 GHz to 300 GHz) signals that perform an auxiliary role such as a fixed wireless access (FWA) point, and millimeter-wave utilization technology, beam-forming utilization technology, and ultra-low delay utilization technology in the 5G communication system have been in their infancy, and in the future 6G communication system, it is expected that wireless communication technology using millimeter-wave band signals capable of real-time beam search in a mobile environment with high mobility will emerge as a key feature.

In the era of 6G communication systems, it is expected that a new industry using various mobile devices such as autonomous cars, robots, and drones will emerge, and as VR/AR/MR technology using ultra-high-resolution video technology of 8k and higher become widespread, ultra-low-latency, high-speed wireless communication networks are needed for control or information exchange between humans and mobile bodies or between mobile bodies.

In the 6G communication system, operating frequency signals of hundreds of GHz or higher are being examined, D-band signals are attracting attention, and technologies that can be applied to the 6G communication system in the D-band are being proactively studied.

In a conventional antenna for the 6G communication system, a RF beam-forming method with excellent interference nulling has been widely used due to its easy scalability, but has a problem in that phase error and loss occur when a large phase is shifted for signals above hundreds of GHz to be used in the 6G communication system.

Conventional subject matter may include Korean Patent Registration No. 10-2446369 (registered on Sep. 19, 2022).

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect of the disclosure, a meta-antenna includes: a substrate including a ground plane; a first slot structure including a plurality of slots disposed on the ground plane; a plurality of feed lines electrically connected to the first slot structure; and a meta-surface including a meta-material, and a plurality of unit cells, the meta-surface spaced apart from the ground plane, wherein the plurality of unit cells each includes a square cross-sectional shape, and a ring-shaped metal pattern formed on one side thereof, and wherein an inner diameter of the metal pattern is smaller than half a length of one side of the square of a unit cell among the plurality of unit cells.

The meta-surface may be arranged in a matrix structure in which the plurality of unit cells includes rows and columns, and the matrix structure may include the plurality of unit cells in which there are no unit cells at positions having corner rows and corner columns.

The matrix structure may include a 5-row, 6-column structure.

A radiation angle of the meta-antenna may vary depending on a distance between the plurality of slots of the first slot structure.

The meta-antenna may further include a second slot structure disposed on the ground plane, the second slot structure may include a plurality of slots.

The meta-surface may face the first slot structure, but may not face the second slot structure.

The plurality of feed lines may be provided in numbers corresponding to the plurality of slots of the first slot structure.

The plurality of feed lines may include microstrip lines.

A radiation direction of an antenna signal may be controlled by the meta-surface.

In another general aspect of the disclosure, a method for a meta-antenna includes: providing a substrate including a ground plane, a first slot structure including a plurality of slots disposed on the ground plane, a plurality of feed lines electrically connected to the first slot structure, and a meta-surface including a meta-material and a plurality of unit cells, the meta-surface spaced apart from the ground plane; and arranging the meta-surface to include the plurality of units cells in which there are no unit cells at positions having corner rows and corner columns, wherein the plurality of unit cells each includes a square cross-sectional shape, and a ring-shaped metal pattern formed on one side thereof, and wherein an inner diameter of the metal pattern is smaller than half a length of one side of the square of a unit cell among the plurality of unit cells.

The method may further include adjusting a radiation angle of the meta-antenna to vary depending on a distance between the plurality of slots of the first slot structure.

The method may further include providing a second slot structure disposed on the ground plane, the second slot structure comprising a plurality of slots, and arranging the meta-surface to face the first slot structure but not the second slot structure. The method may further include controlling a radiation direction of an antenna signal by the meta-surface.

The effects that can be obtained from the present disclosure are not limited to the above-mentioned effects, and other effects, which are not mentioned herein, will be clearly understood by those skilled in the art from the description below.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
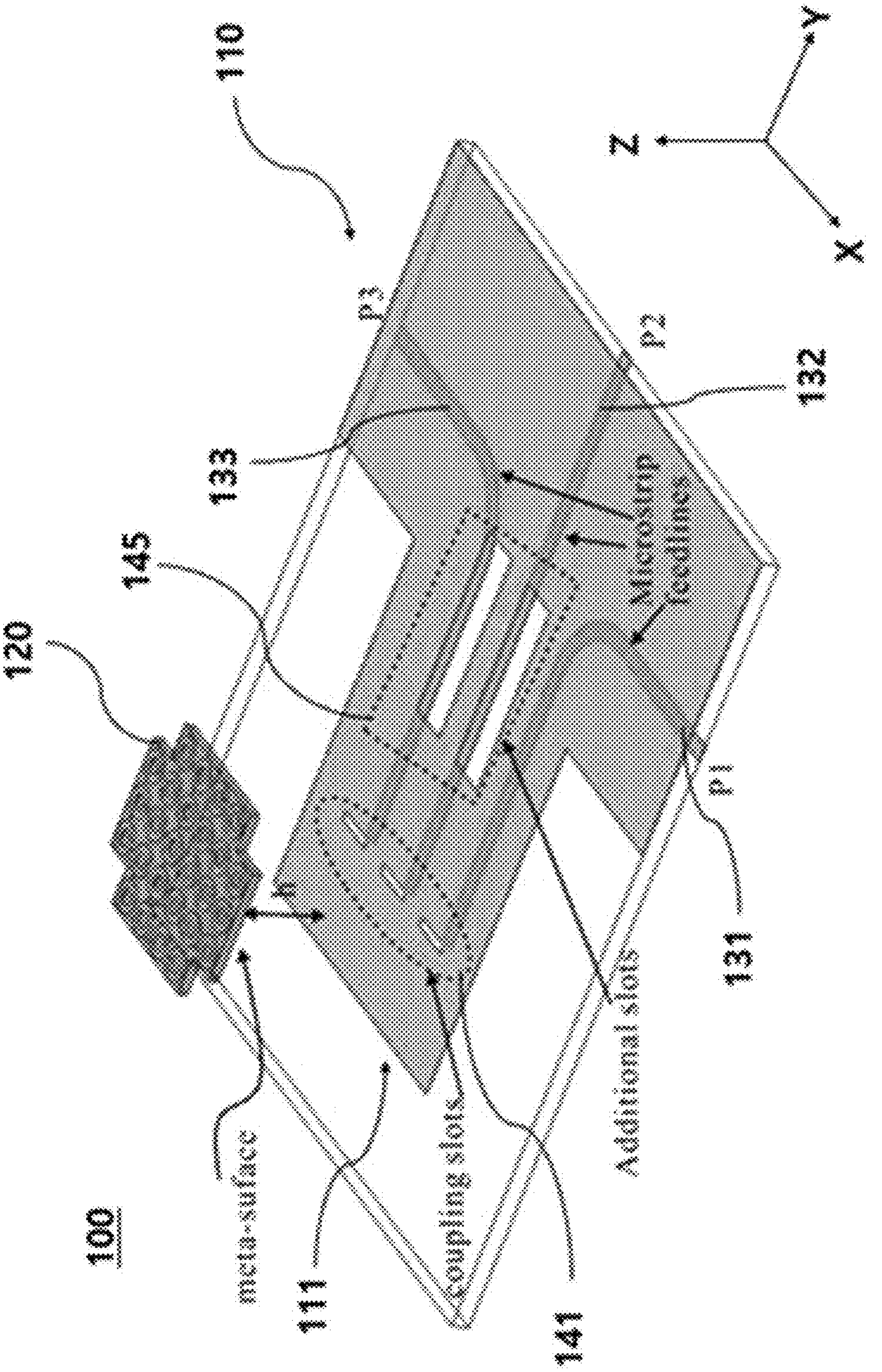
FIG. 1 is a perspective view showing a meta-antenna according to an embodiment of the present disclosure.

Advantages and features of the present disclosure, and methods of accomplishing the same will be clearly understood with reference to embodiments described below in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present disclosure is to be defined only by the scope of the appended claims.

Terms used herein will be briefly described, and the present disclosure will be described in detail.

Although the terms used in the present disclosure are selected from generally known and used terms considering their functions in the present disclosure, the terms may be modified depending on intention of a person skilled in the art, practices, or the advent of new technology. Besides, in a specific case, some terms may be arbitrarily chosen by the present applicant, and in this case, the meanings of those terms will be described in corresponding parts of the present disclosure in detail. Accordingly, the terms used herein should be understood not simply by the actual terms used but by the meaning lying within and the description disclosed herein.

Throughout the specification, when a portion may "include" a certain element, unless specified otherwise, it may not be construed to exclude another element but may be construed to further include other elements. Moreover, terms described in the specification such as "part," "module," and "unit," refer to a unit of processing at least one function or operation, and may be implemented by software, a hardware element such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software elements, object-oriented software elements, elements such as class elements and task elements, processes, functions, properties, procedures, subroutines, segments in program codes, drivers, firmware, microcode, circuits, data, databases, data structures, tables, arrays, and variables.

Hereinafter, embodiments of the present disclosure will be described in detail with reference to the accompanying drawings so as to be easily implemented by those skilled in the art. In addition, parts irrelevant to description will be omitted in the drawings in order to clearly describe the present disclosure.

The terms including an ordinal number such as "first," "second," and the like may be used to describe various elements, but the elements should not be limited by those terms. The terms are used merely for the purpose to distinguish an element from the other element. For example, a first element may be named to a second element, and similarly, a second element may be named to a first element without departing from the scope of right of the invention. The term "and/or" includes a combination of a plurality of related items or any one item from among the plurality of related items.

In recent years, studies on techniques of artificially creating materials with new electromagnetic properties that do not exist naturally, called meta-materials, have been carried out in order to manufacture reduced sized antennas, and specifically, studies on the development of small antennas that are not limited by physical size by using new electromagnetic wave characteristics of a left-handed metamaterial (LHM), which is a material having negative permittivity and permeability at the same time, have been actively carried out.

A meta-antenna (or meta-surface antenna) containing such a meta-material is a highly-directional antenna that can strongly transmit electromagnetic waves incident from a supply antenna in a single or multiple directions as a plane wave. Compared to a conventional phased array antenna, the meta-surface antenna has an advantage such as low power, light weight, and low profile, and thus may be applicable to a wide range of applications such as satellite communication antennas and radars.

FIG. 1 is a perspective view showing a meta-antenna according to an embodiment of the present disclosure.

Figure 2:
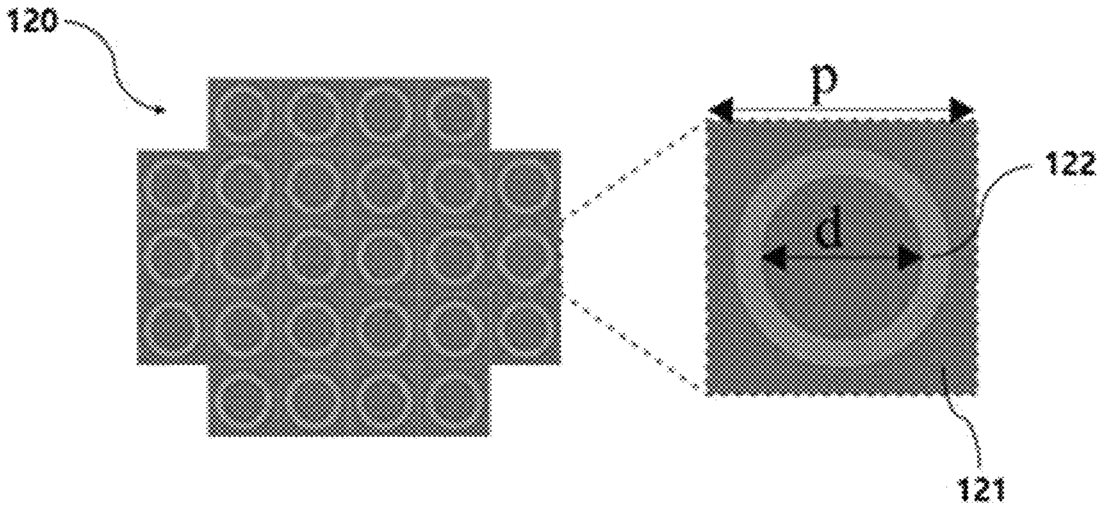
FIG. 2 is a plan view for explaining a meta-surface according to an embodiment of the present disclosure.

FIG. 2 is a plan view for explaining a meta-surface according to an embodiment of the present disclosure.

The embodiments of FIGS. 1 and 2 may be combinable with embodiments of other drawings.

Referring to FIGS. 1 and 2, the meta-antenna 100 may include a substrate 110 and a meta-surface 120. The meta-surface 120 may also be referred to as a meta-structure.

For example, the substrate 110 may be an FR-4 substrate, but is not limited thereto. The substrate 110 may be an RT/duroid 5880 substrate, but is not limited thereto. A thickness of the substrate 110 may be about 0.254 mm, but is not limited thereto and may have a thickness with various values.

The meta-antenna 100 may include a first feed line 131, a second feed line 132, and a third feed line 133 disposed on one side (e.g., a bottom) of the substrate 110. The feed lines may be configured as microstrip lines, but are not limited thereto. Additionally, the feed lines may be defined as an input port, but are not limited thereto. The feed lines may be provided in numbers corresponding to a plurality of slots in a first slot structure 141 and connected to the plurality of slots, respectively. The feed lines 131, 132, 133 may be disposed between a ground plane 111 and the substrate 110.

The substrate 110 may include the ground plane 111 in which slot structures 141, 145 are disposed. For example, the first slot structure 141, and a second slot structure 145 may include slots disposed in the ground plane 111. The ground plane 111 may be laminated on one surface of the substrate 110.

The meta-surface 120 may include a plurality of unit cells 121. The meta-surface 120 may be defined and referred to as a meta-structure formed by an array with a plurality of unit cells 121.

The meta-surface 120 may be spaced apart from one surface of the substrate 110 by a predetermined first distance (h) in a first direction (Z-axis direction). According to a certain embodiment, the meta-surface 120 may be laminated on one surface of the substrate 110.

The first slot structure 141 may be electromagnetically connected to the meta-surface 120 based on power provided from the feed lines 131, 132, 133, thereby exciting the meta-surface 120. For example, the first slot structure 141 may be electromagnetically coupled to the meta-surface 120, thereby radiating an antenna signal to the outside through the meta-surface 120 through a capacitance formed between coupled portions thereof.

The first slot structure 141 may be provided with three slots (as illustrated in FIG. 1), but is not limited thereto. Furthermore, the first slot structure 141 may be arranged to face the meta-surface 120 in the first direction (Z-axis direction). The first slot structure 141 may also be referred to as a coupling slot. In addition, the meta-surface 120 may be excited by a CPW line, a GCPW line, an SIW line with a slot-based cavity, a microstrip line integrated with a patch antenna, a slot line, or the like, but is not limited thereto.

The second slot structure 145 may be provided with two slots (as illustrated in FIG. 1), but is not limited thereto. Additionally, the second slot structure 145 may be arranged not to face the meta-surface 120 in the first direction (Z-axis direction). The second slot structure 145 may be electromagnetically connected to the meta-surface 120 based on power provided from the second feed line 132, thereby exciting the meta-surface 120. The second slot structure 145 may also be referred to as an additional slot. The second slot structure 145 may be used to improve gain.

The meta-surface 120 may be formed by combining a plurality of unit cells 121 (unit cells). As an example of the meta-surface 120, the meta-surface 120 may be disposed in a 5-row, 6-column arrangement as shown in FIG. 2, but there are no unit cells at corners thereof, but is not limited thereto. For example, the plurality of unit cells 121 of the meta-surface 120 may be arranged in a matrix structure, but there may be no unit cells at positions having corner rows and columns (e.g., a position of row 1 and column 1, a position of row 1 and column 6, and a position of row 5 and column 1, and a position of row 5 and column 6).

The unit cell 121 may have a square cross-sectional shape, and a length (p) of one side of the unit cell 121, for example, may be 0.54 mm, but is not limited thereto. Furthermore, a ring-shaped metal pattern 122 may be formed on a surface of the unit cell 121.

An internal diameter (d) of the metal pattern 122, for example, may be 0.24 mm, but is not limited thereto.

For example, an inner diameter (d) of the metal pattern 122 may be less than half a length (p) of one side of the unit cell 121, but is not limited thereto.

Figure 3:
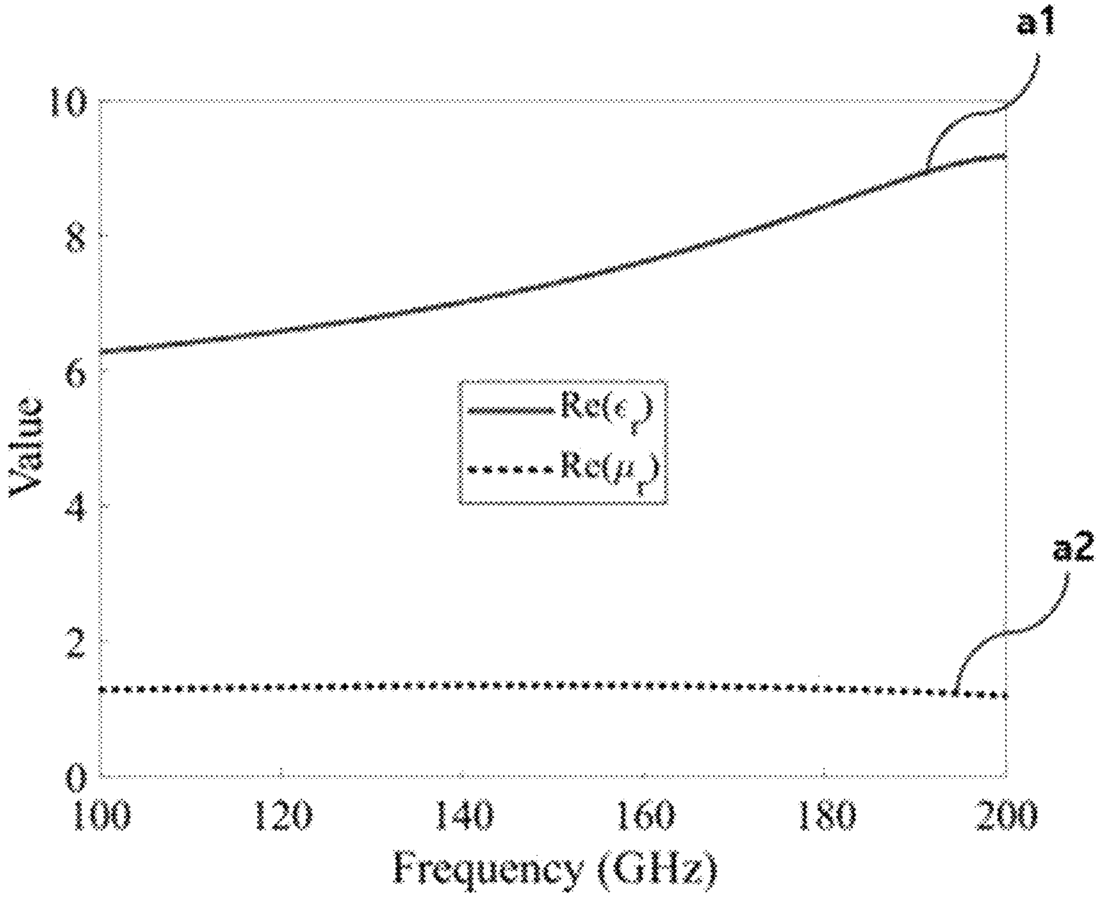
FIG. 3 is a graph showing a permittivity and a permeability of a meta-antenna according to an embodiment of the present disclosure.

FIG. 3 is a graph showing a permittivity and a permeability of a meta-antenna according to an embodiment of the present disclosure.

Referring to FIG. 3, the values of permittivity (a1) and permeability (a2) for a frequency range of the meta-antenna 100 described with reference to FIGS. 1 and 2 as an example are shown.

The meta-antenna 100 as shown in FIGS. 1 and 2 may have a permittivity (a1) value of 7 and a permeability value of 1.34 at a frequency of 140 GHz. The meta-surface 120 of the meta-antenna 100 may have a large dielectric constant area when excited based on the first feed line 131 and the third feed line 133.

Since the performance of the meta-surface 120 is determined by permittivity and permeability values, the shape of the unit cell 121 may not be limited to the shape shown and may be provided in various shapes. For example, the shape of the unit cell 121 may be provided with a circle, a rectangle, a ring-shaped rectangle (e.g., a rectangle formed with curved corners), a hexagon, or a ring-shaped hexagon (e.g., a rectangle formed with curved vertices), but may not be limited thereto, and may be provided in various shapes depending on the required performance of the meta-surface 120.

In addition, the number of the plurality of unit cells 121 may not be limited to the number shown, and may be provided in various numbers depending on the form (or shape) of the unit cells 121 designed based on the permittivity and permeability values. That is, the number of the plurality of unit cells 121 may vary depending on the required performance of the meta-surface 120.

Figure 4:
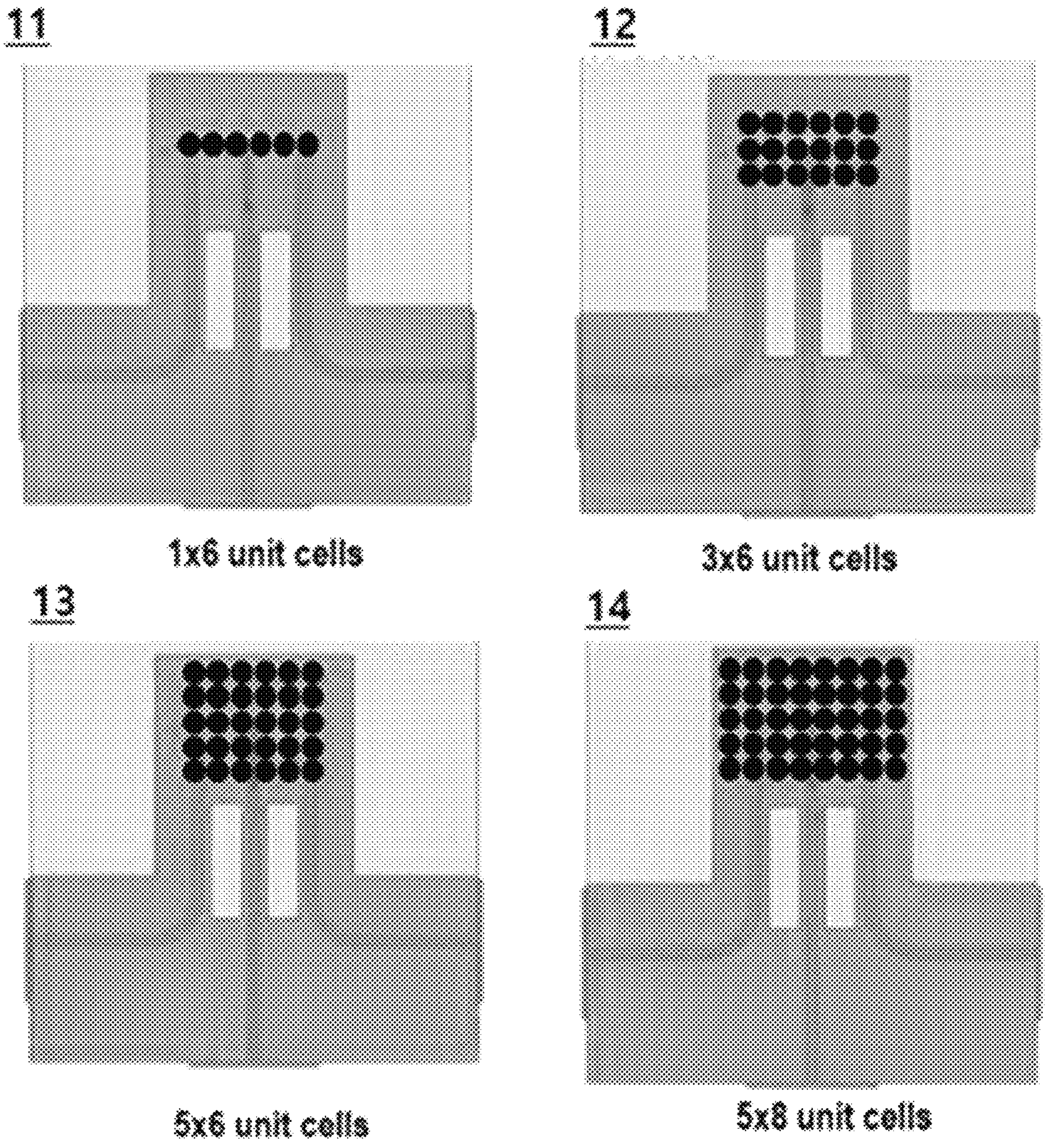
FIG. 4 is a diagram showing a meta-antenna according to a comparative example.

FIG. 4 is a diagram showing a meta-antenna according to a comparative example.

Figure 5:
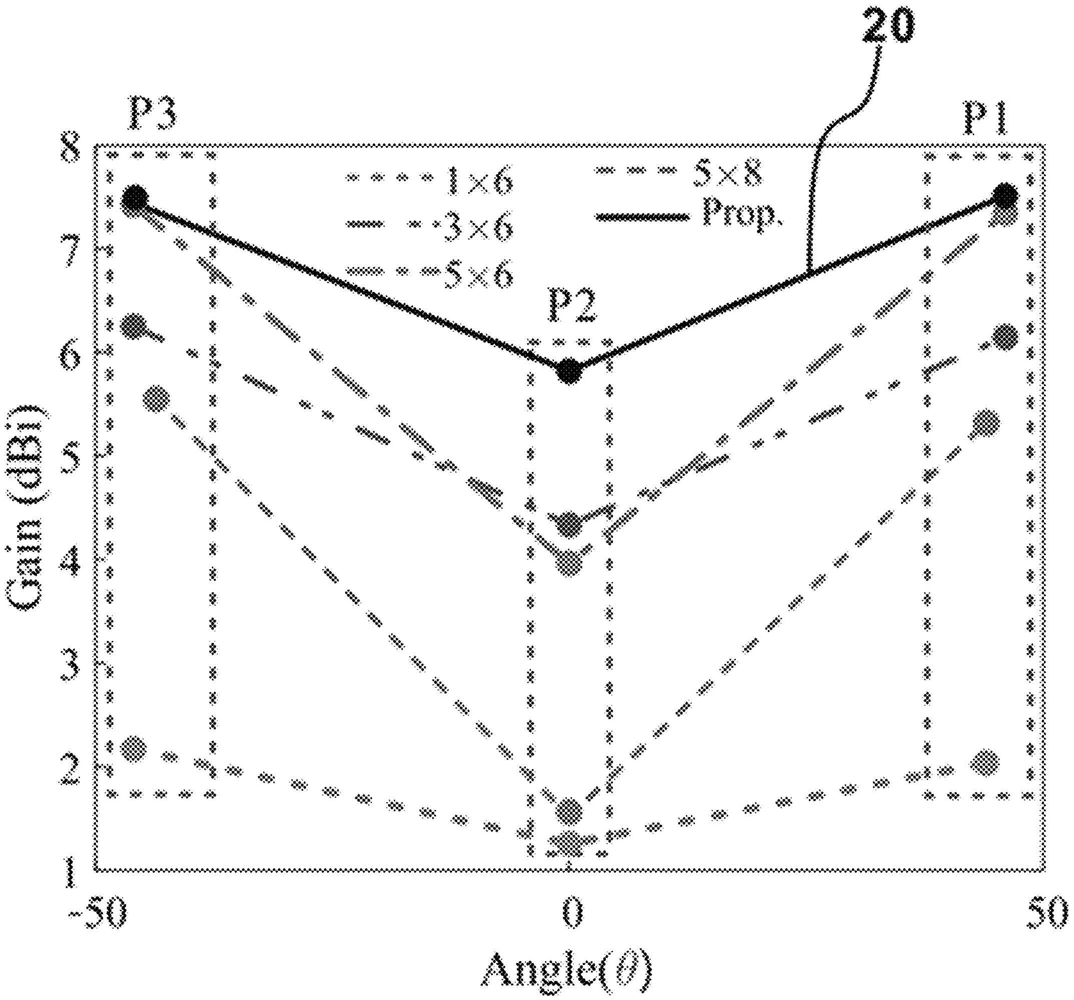
FIG. 5 is a graph for explaining a gain of a meta-antenna according to the embodiment and comparative example of the present disclosure.

FIG. 5 is a graph for explaining a gain of a meta-antenna according to the embodiment and comparative example of the present disclosure. FIG. 5 shows an antenna gain measured in a frequency range of 140 GHz, and P1, P2, and P3 in FIG. 5 represent the use of the first feed line 131, the second feed line 132, and the third feed line 133, respectively.

Referring to FIG. 4, a case where the unit cells are arranged in 1 row by 6 columns (11), a case where the unit cells are arranged in 3 rows by 6 columns (12), a case where the unit cells are arranged in 5 rows by 6 columns (13), and a case where the unit cells are arranged in 5 rows by 8 columns are shown.

As shown in FIG. 5, in the case of the meta-antenna 100 having the same arrangement as the meta-surface 120 of FIG. 2, it is seen that an antenna gain (20) is measured to be higher for all radiation angles when compared to a meta-antenna having the same arrangement as the comparative example of FIG. 4.

In the case of the meta-antenna 100 having the same arrangement as the meta-surface 120 of FIG. 2, it is seen that an antenna gain is measured to be higher, for all feed lines as well as all radiation angles, than meta-antennas according to the comparative example.

Figure 6:
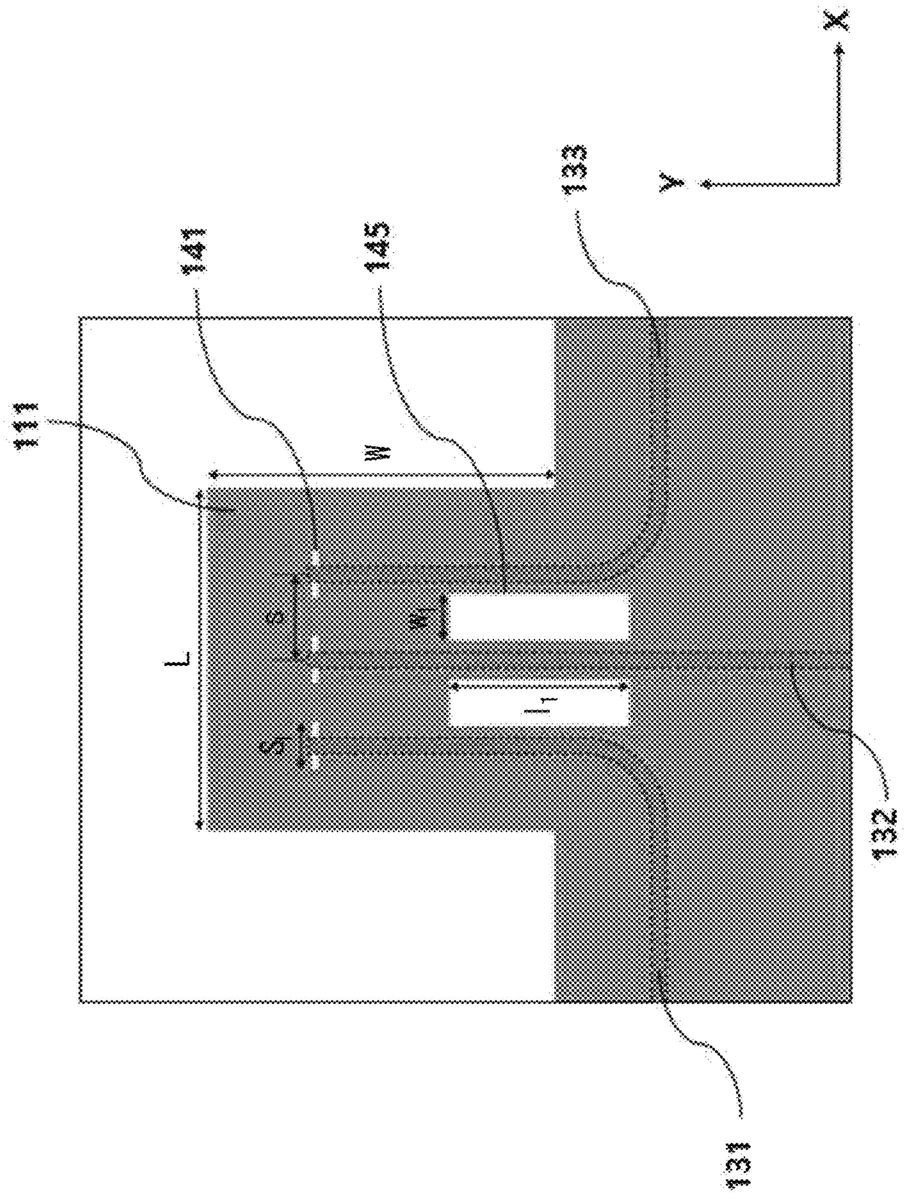
FIG. 6 is a top view of a ground plane and slot structures according to an embodiment of the present disclosure.

FIG. 6 is a top view of a ground plane and slot structures according to an embodiment of the present disclosure.

Referring to FIGS. 1, 2, and 6, energy for radiating an antenna signal may be provided from the first feed line 131, the second feed line 132, and the third feed line 133 to the meta-surface 120 through the first slot structure 141. To this end, the first slot structure 141 and the meta-surface 120 may be electromagnetically connected to each other. The first slot structure 141 may be provided with three slots, a size of a cross-sectional area of each slot (a size of a cross-sectional area on a plane consisting of X and Y axes) may be a product of a width (s1) of the slot (a width in an X-axis direction) and a length of the slot (a length in a Y-axis direction), and a length of the slot may be 0.12 mm.

The meta-surface 120 may be spaced apart from a feed structure (the substrate 110 including feed lines) by a specified first distance (h). The first distance (h) may have various values depending on design changes. A distance (s) between the slots of the first slot structure 141 (e.g., as a distance in an X-axis direction, a distance between the centers of the slots in the X-axis direction) may be adjusted, thereby adjusting (or varying) a radiation angle of the antenna signal.

According to one embodiment, the ground plane 111 may include at least one portion that protrudes more than the other portion. The first slot structure 141 may be formed in the protruding portion. The structure of the protruding portion may be modified to adjust a radiation angle of the meta-surface 120.

As an example, L is 5 mm as a width of the protruding portion of the ground plane 111 formed with the first slot structure 141 (a length in the X-axis direction), w is 5.2 mm as a length of the protruding portion of the ground plane 111 formed with the first slot structure 141 (a length in the Y-axis direction), s1 is 0.71 mm as a width of the slot of the first slot structure 141 (a width in the X-axis direction), s is 1.25 mm as a distance between the slots of the first slot structure 141 (a distance in the X-axis direction), w1 is 0.7 mm as a width of the slot of the second slot structure 145 (a width in the X-axis direction), 11 is 2.7 mm as a length of the slot of the second slot structure 145 (a length in the Y-axis direction), but the parameter values may have various values depending on design changes. Meanwhile, the first feed line 131 and the third feed line 133 may be disposed asymmetrically. Additionally, depending on the arrangement of the feed lines, the arrangement of the meta-surface 120 may be modified.

Figure 7:
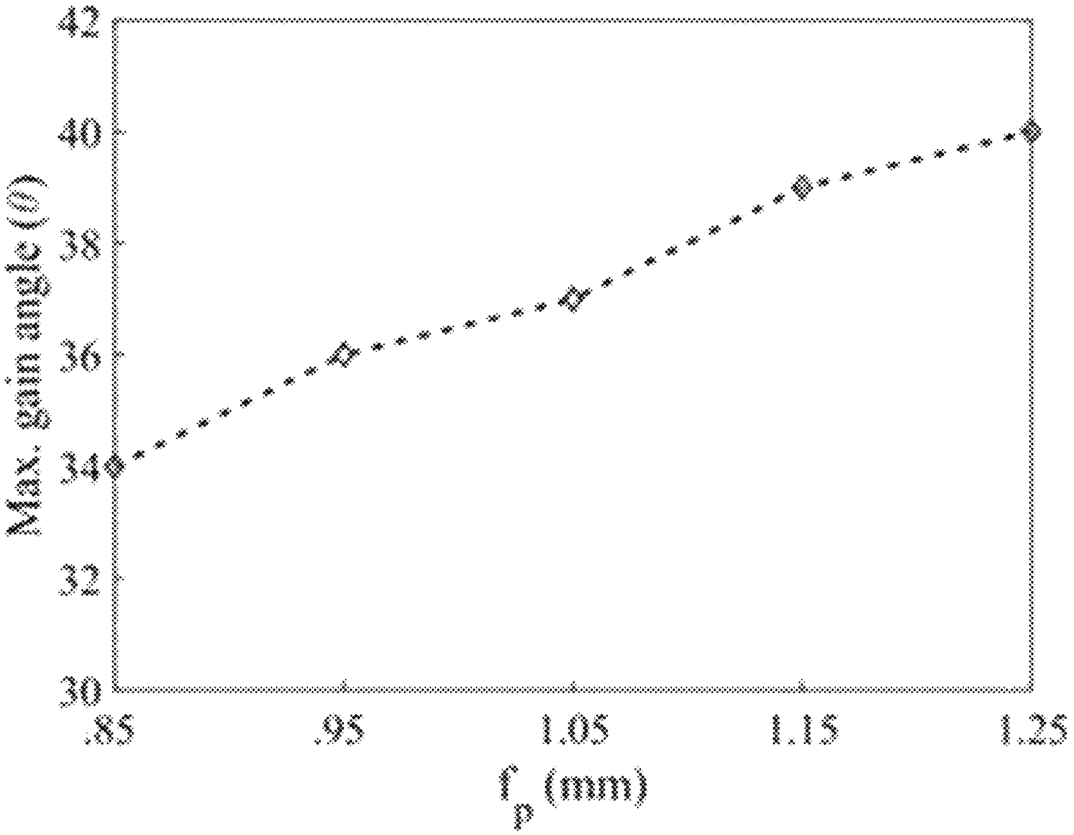
FIG. 7 is a graph showing a maximum radiation angle of an antenna signal according to a distance ($f_p$) between slots in a first slot structure according to an embodiment of the present disclosure.

FIG. 7 is a graph showing a maximum radiation angle of an antenna signal according to a distance ($f_p$) between slots in a first slot structure according to an embodiment of the present disclosure. Referring to FIG. 7, it is shown that the maximum radiation angle of the antenna signal varies depending on the distance ($f_p$) (e.g., (s) in FIG. 6) between the slots of the first slot structure 141.

Figure 8:
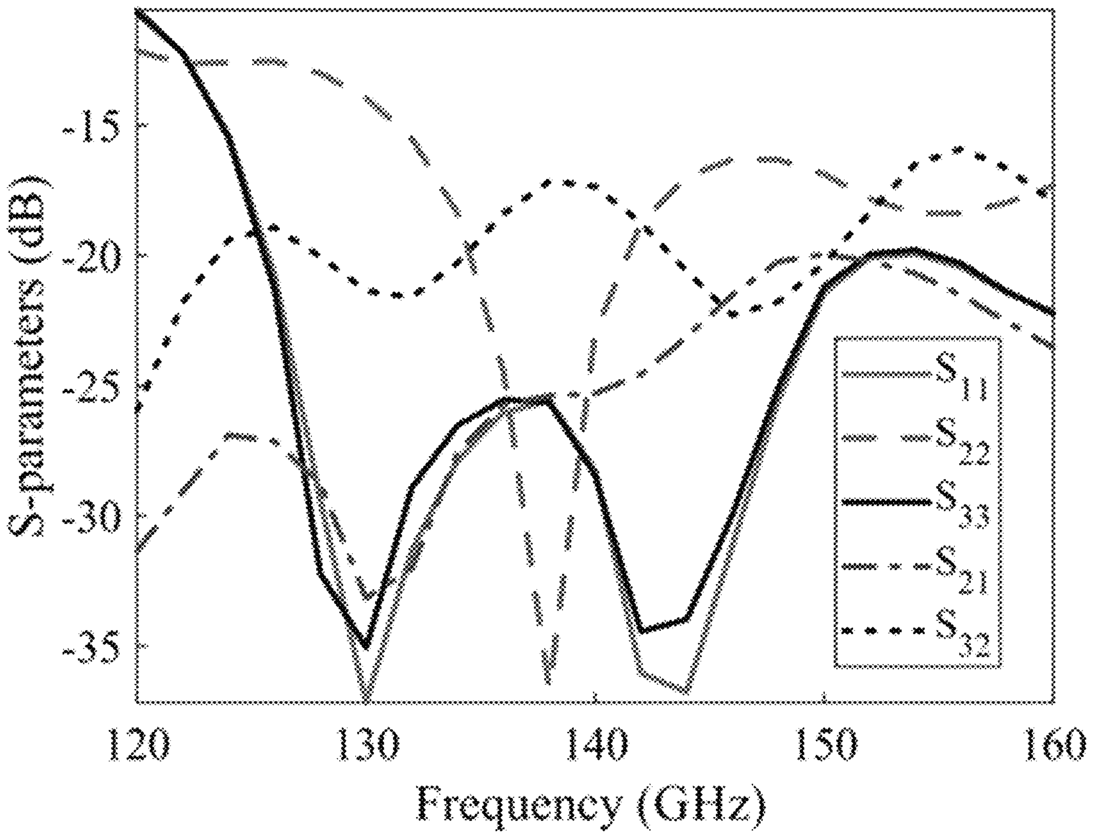
FIG. 8 is a graph showing S-parameter values according to a frequency of the meta-antenna according to an embodiment of the present disclosure.

FIG. 8 is a graph showing S-parameter values according to a frequency of the meta-antenna according to an embodiment of the present disclosure.

The S-parameter value represents a ratio of output power to input power at each port. For example, $S_{21}$ represents a ratio between an input voltage at port 2 (e.g., the second feed line 132) and an output voltage at port 1 (e.g., the first feed line 131). In addition, $S_{32}$ represents a ratio between an input voltage at port 3 (e.g., the third feed line 133) and an output voltage at port 2 (e.g., the second feed line 132). $S_{11}$, $S_{22}$, and $S_{33}$ represent reflection coefficients of respective ports (e.g., the first feed line 131, the second feed line 132, and the third feed line 133).

Referring to FIG. 8, it is seen that $S_{11}$, $S_{22}$, and $S_{33}$ all have values of −10 dB or less in a range of about 130 GHz to about 150 GHz.

Figure 9:
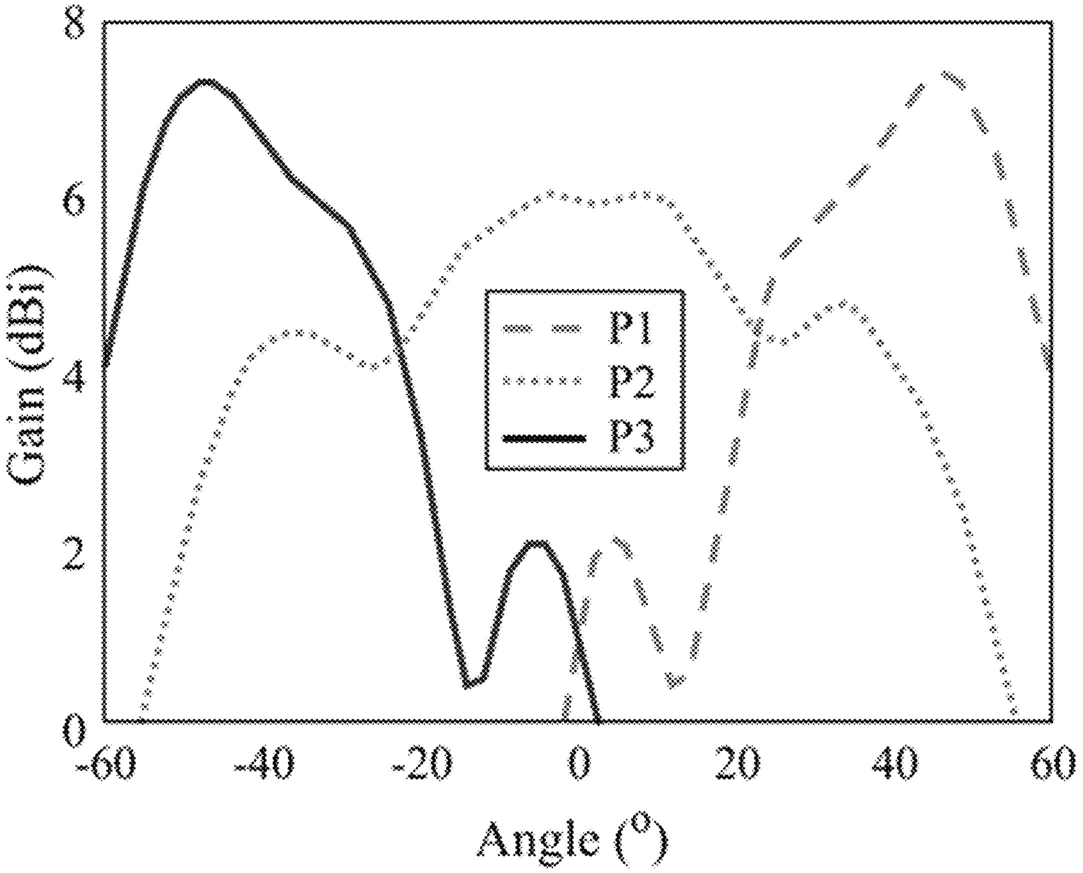
FIG. 9 is a graph showing a gain according to a radiation angle of a meta-antenna in a frequency range of 140 GHz, according to an embodiment of the present disclosure.

FIG. 9 is a graph showing a gain according to a radiation angle of a meta-antenna in a frequency range of 140 GHz, according to an embodiment of the present disclosure.

FIG. 9 shows a radiation pattern of the meta-antenna at $\phi$=0° in a frequency range of 140 GHz when different ports (e.g., the first feed line 131, the second feed line 132, and the third feed line 133) are excited.

Referring to FIG. 9, when the first port P1 (e.g., the first feed line 131) is excited, it is seen that the meta-antenna 100 radiates maximum power at a radiation angle of about 46°. When the first port P2 (e.g., the first feed line 132) is excited, it is seen that the meta-antenna 100 radiates maximum power at a radiation angle of about 0°. In addition, when the first port P3 (e.g., the first feed line 133) is excited, it is seen that the meta-antenna 100 radiates maximum power at a radiation angle of about −48°.

As an example, in millimeter-wave frequencies such as D-band active beam-forming networks, there is a problem in that there may be excessive signal loss and the generated power may be low. In addition, when designing an active beam-forming network, there may be a problem in that network systems may become overly complicated. To solve these problems, various embodiments of the disclosure provide a meta-antenna capable of controlling the radiation direction of an antenna signal using a meta-surface.

The embodiments described herein and the configurations shown in the drawings are only preferred examples of the present disclosure, and there may be various modifications that can replace the embodiments and drawings herein at the time of filing this application.

In addition, like reference numerals or symbols indicated in each drawing herein refer to like components or elements that perform substantially the same functions. The shapes and sizes of elements in the drawings may be exaggerated for clarity.

Identification symbols used in respective steps may be used for convenience of description, wherein the identification symbols do not describe the order of the respective steps, and the respective steps may be implemented differently from the specified order unless a specific order is clearly stated in the context.

It will be understood by those skilled in the art that various modifications may be made thereto without departing from the gist of the present disclosure. Therefore, it should be noted that the methods disclosed herein are merely illustrative but not restrictive to the concept of the present disclosure. The scope of the present disclosure is defined by the appended claims rather than the detailed description, and all differences within the scope equivalent thereto should be construed as being included in the scope of the present disclosure.

What is claimed is:

1. A meta-antenna comprising:

a substrate comprising a ground plane;

a first slot structure comprising a plurality of slots disposed on the ground plane;

a plurality of feed lines electrically connected to the first slot structure; and a meta-surface comprising a meta-material, and a plurality of unit cells, the meta-surface spaced apart from the ground plane, wherein the plurality of unit cells each includes a square cross-sectional shape, and a ring-shaped metal pattern formed on one side thereof, and wherein an inner diameter of the metal pattern is smaller than half a length of one side of the square of a unit cell among the plurality of unit cells.

2. The meta-antenna of claim 1, wherein the meta-surface is arranged in a matrix structure in which the plurality of unit cells includes rows and columns, and wherein in the matrix structure includes the plurality of unit cells in which there are no unit cells at positions having corner rows and corner columns.

3. The meta-antenna of claim 2, wherein the matrix structure comprises a 5-row, 6-column structure.

4. The meta-antenna of claim 1, wherein a radiation angle of the meta-antenna varies depending on a distance between the plurality of slots of the first slot structure.

5. The meta-antenna of claim 1, further comprising:

a second slot structure disposed on the ground plane, the second slot structure comprising a plurality of slots.

6. The meta-antenna of claim 5, wherein the meta-surface faces the first slot structure, but does not face the second slot structure.

7. The meta-antenna of claim 1, wherein the plurality of feed lines are provided in numbers corresponding to the plurality of slots of the first slot structure.

8. The meta-antenna of claim 1, wherein the plurality of feed lines comprise microstrip lines.

9. The meta-antenna of claim 1, wherein a radiation direction of an antenna signal is controlled by the meta-surface.

10. A method for a meta-antenna, the method comprising:

providing a substrate including a ground plane, a first slot structure including a plurality of slots disposed on the ground plane, a plurality of feed lines electrically connected to the first slot structure, and a meta-surface including a meta-material and a plurality of unit cells, the meta-surface spaced apart from the ground plane; and arranging the meta-surface to include the plurality of unit cells in which there are no unit cells at positions having corner rows and corner columns, wherein the plurality of unit cells each includes a square cross-sectional shape, and a ring-shaped metal pattern formed on one side thereof, and wherein an inner diameter of the metal pattern is smaller than half a length of one side of the square of a unit cell among the plurality of unit cells.

11. The method of claim 10, further comprising:

adjusting a radiation angle of the meta-antenna to vary depending on a distance between the plurality of slots of the first slot structure.

12. The method of claim 10, wherein the meta-surface is arranged in a matrix structure, the matrix structure comprises a 5-row, 6-column structure.

13. The method of claim 10, further comprising:

providing a second slot structure disposed on the ground plane, the second slot structure comprising a plurality of slots; and arranging the meta-surface to face the first slot structure but not the second slot structure.

14. The method of claim 10, wherein the plurality of feed lines are provided in numbers corresponding to the plurality of slots of the first slot structure.

15. The method of claim 10, wherein the plurality of feed lines comprise microstrip lines.

16. The method of claim 10, further comprising:

controlling a radiation direction of an antenna signal by the meta-surface.

* * * * *